(12) United States Patent
Schoenmakers et al.

(10) Patent No.: US 8,176,778 B2
(45) Date of Patent: May 15, 2012

(54) CAPACITIVE LEVEL SENSOR WITH A PLURALITY OF SEGMENTS COMPRISING EACH A CAPACITOR AND A CIRCUIT

(75) Inventors: Kees Schoenmakers, Berlicum (NL); Jan Slezak, Rijsbergen (NL)

(73) Assignee: Siemens Aktiengesellschaft, München (DE)

(*) Notice: Subject to any disclaimer, the term of this patent is extended or adjusted under 35 U.S.C. 154(b) by 672 days.

(21) Appl. No.: 11/988,608

(22) PCT Filed: Jul. 11, 2006

(86) PCT No.: PCT/EP2006/064113
§ 371 (c)(1),
(2), (4) Date: May 13, 2009

(87) PCT Pub. No.: WO2007/006788
PCT Pub. Date: Jan. 18, 2007

(65) Prior Publication Data
US 2009/0320587 A1    Dec. 31, 2009

(30) Foreign Application Priority Data

Jul. 11, 2005  (EP) ..................................... 05015019

(51) Int. Cl.
*G01F 23/26* (2006.01)
(52) U.S. Cl. ...................................... 73/304 C
(58) Field of Classification Search ................ 73/304 C, 73/304 R; 116/227
See application file for complete search history.

(56) References Cited

U.S. PATENT DOCUMENTS

| | | | | |
|---|---|---|---|---|
| 3,010,320 A * | 11/1961 | Sollecito | ..................... | 73/304 C |
| 4,003,259 A | 1/1977 | Hope | ........................ | 73/304 C |
| 4,611,489 A | 9/1986 | Spaargaren et al. | ......... | 73/304 C |
| 4,716,536 A * | 12/1987 | Blanchard | ...................... | 702/100 |
| 5,399,979 A | 3/1995 | Henderson et al. | ........... | 324/677 |
| 5,437,184 A * | 8/1995 | Shillady | ....................... | 73/304 C |
| 6,101,873 A | 8/2000 | Kawakatsu et al. | .......... | 73/304 C |
| 6,564,630 B1 * | 5/2003 | Klemp | .......................... | 73/304 C |
| 6,761,067 B1 | 7/2004 | Capano | ........................ | 73/304 C |

FOREIGN PATENT DOCUMENTS

| | | |
|---|---|---|
| JP | 60213822 A | 10/1985 |
| SU | 409 082 A | 11/1973 |

* cited by examiner

*Primary Examiner* — Hezron E Williams
*Assistant Examiner* — Tamiko Bellamy

(57) ABSTRACT

A capacitive level sensor comprises a probe which is longitudinally segmented into a plurality of segments. Each segment comprises an electrode forming an electrical capacitor to a common ground electrode. Each electrode is connected to a measuring circuit via an associated one of a plurality of controllable switches. A control means controls said switches to successively and separately connect the capacitors to the measuring circuit. To simplify the design and manufacture of the level sensor, the controllable switches are individually arranged in the associated segments of the probe, and the control means is subdivided into control units respectively arranged in the segments and connected to a single control line. Alternatively, if a plurality of controllable measuring circuits are individually arranged in the associated segments and connected to an associated one of said electrodes, and if the control means successively and separately activates the measuring circuits, the control means is subdivided into control units respectively arranged in the segments of the probe and connected to a single control line.

20 Claims, 4 Drawing Sheets

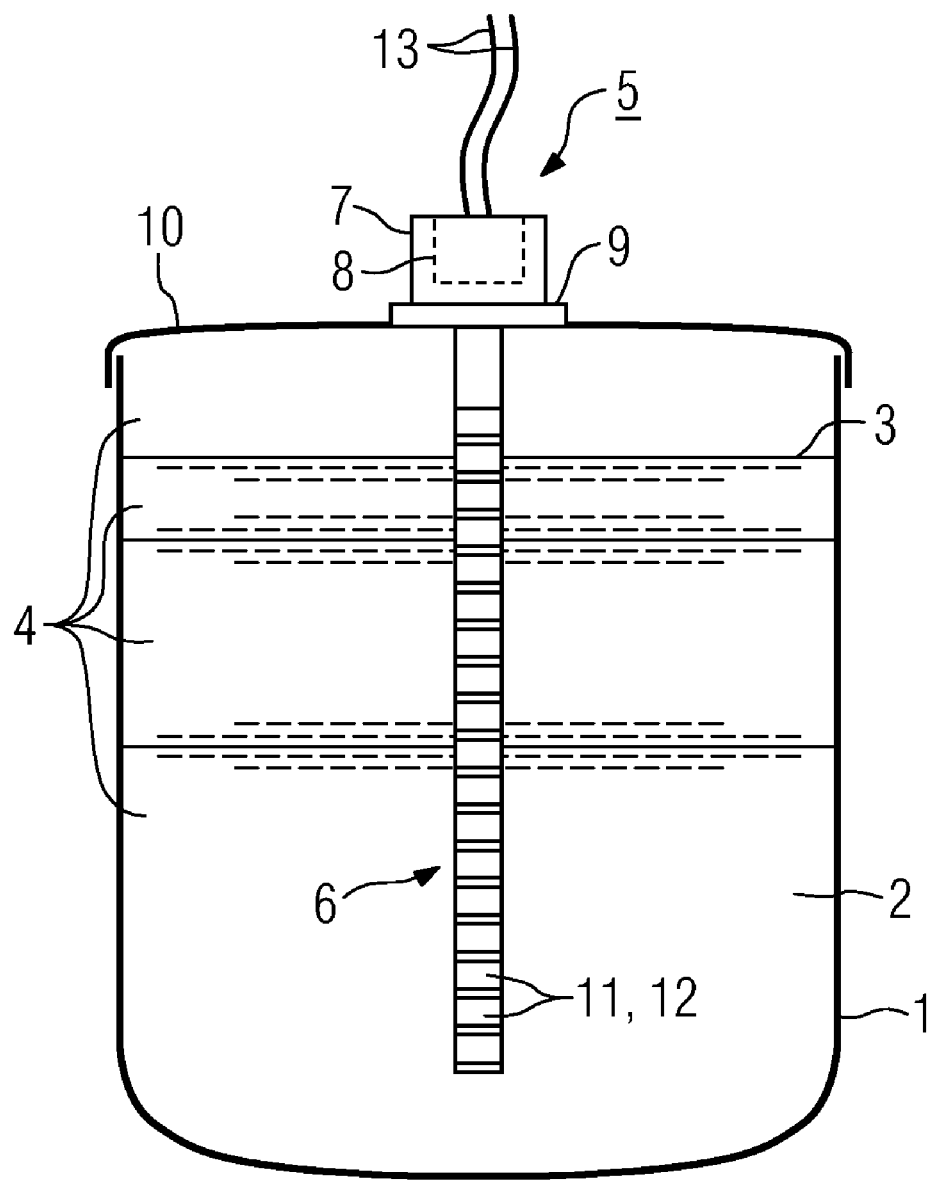

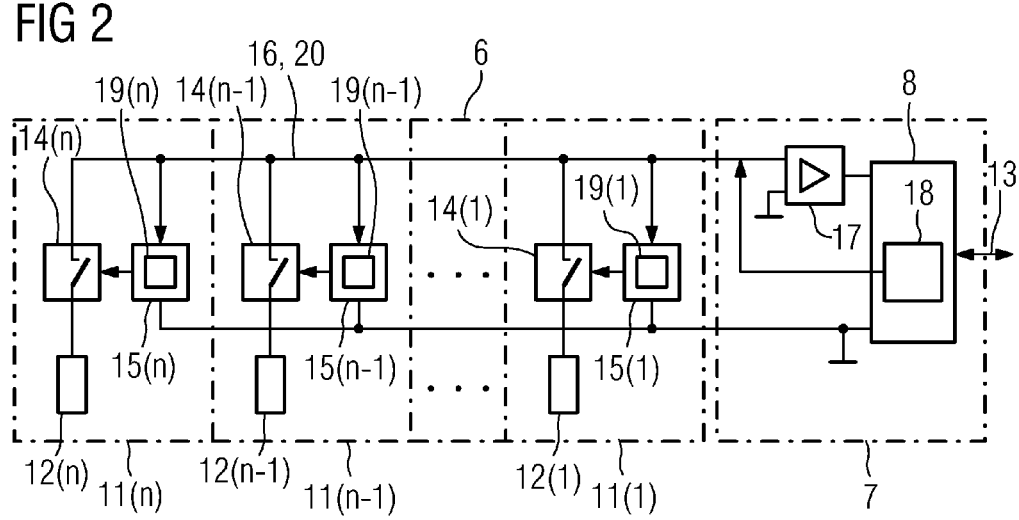
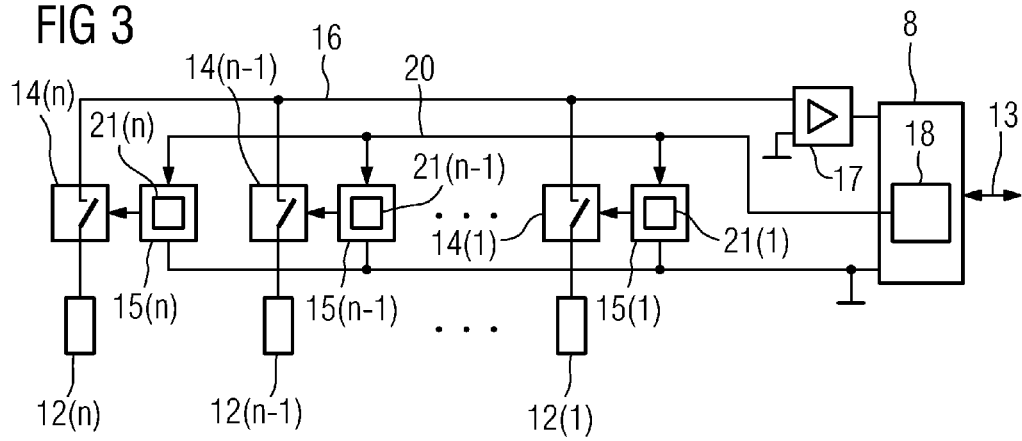
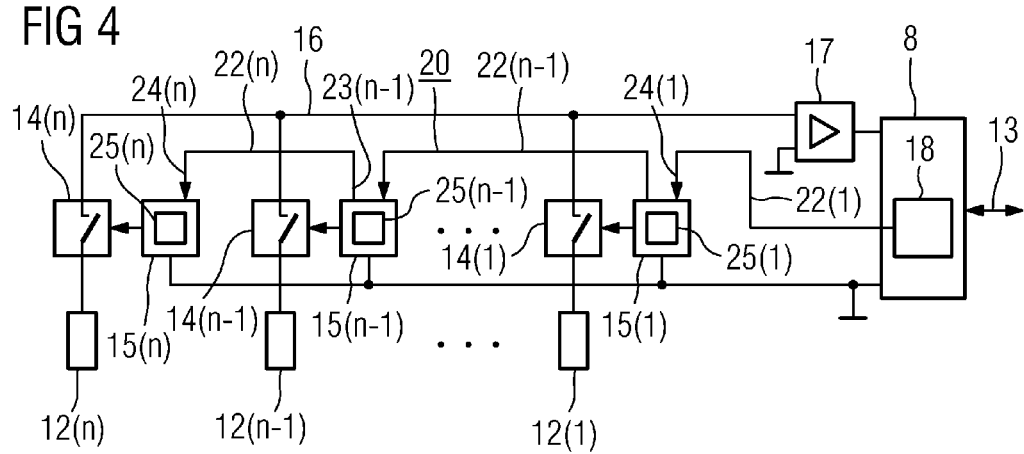

CAPACITIVE LEVEL SENSOR WITH A PLURALITY OF SEGMENTS COMPRISING EACH A CAPACITOR AND A CIRCUIT

CROSS REFERENCE TO RELATED APPLICATIONS

This application is the US National Stage of International Application No. PCT/EP2006/064113, filed Jul. 11, 2006 and claims the benefit thereof. The International Application claims the benefits of European Patent Office application No. EP 05015019.2 filed Jul. 11, 2005, both of the applications are incorporated by reference herein in their entirety.

FIELD OF INVENTION

The invention relates to a capacitive level sensor.

BACKGROUND OF INVENTION

Such a level sensor is known from U.S. Pat. Nos. 5,399,979, 6,101,873 or 6,761,067.

For measuring the filling level of a measuring medium, such as a fluid or bulk material, in a vessel the known sensor has an elongated, for example a rod-shaped, probe which extends vertically over the fillable vessel height and dips into the measuring medium. The probe is longitudinally segmented into a plurality of segments, each segment comprising an electrode and each electrode forming an electrical capacitor to a common ground electrode, such as the conductive vessel wall or a separate elongated electrode, which can be arranged inside or outside the vessel or can be formed directly on the probe.

The level measurement, which also includes detecting multiple medium layers, such as water and oil, and interfaces between them, is performed by successively and separately measuring the capacities of the individual capacitors.

For this purpose, the electrodes or capacitors can be successively and separately connected to the input of a measuring circuit by means of a plurality of controllable switches. The measuring circuit then generates successively a plurality of measuring signals in dependence on the capacities of the individual capacitors. If the switches are located in the head portion of the probe near to the measuring circuit, the probe comprises a plurality of signal lines between the electrodes and the switches, the number of the signal lines corresponding to the number of the electrodes or switches. If the switches are arranged in the associated segments of the probe only one signal line between the switches and the measuring circuit but a plurality of control lines for controlling the switches are needed, the number of the control lines corresponding to the number of the electrodes or switches. U.S. Pat. No. 4,003,259 discloses an alternative embodiment in which the switches are reed contacts which can be successively opened and closed by a magnet movable along the probe.

Alternatively to the aforementioned solutions, a plurality of controllable measuring circuits are individually arranged in the segments of the probe, each measuring circuit being connected to an associated one of said electrodes. A control means successively and separately activates the measuring circuits to generate measuring signals in dependence on the capacity of the respective capacitors. The probe thus comprises a corresponding plurality of control lines between the measuring circuits and the control means.

The or each measuring circuit may comprise a signal generator for applying an electrical signal to the respective capacitor and a receiver for measuring the voltage across or the current through the capacitor. Alternatively, the or each measuring circuit comprises an oscillator wherein the respective capacitor forms a frequency-determining element of said oscillator.

JP 60-213822 discloses a capacitive level sensor in which the electrodes are connected to the clock input of associated flip-flops which form a shift register. Therefore, the clock signal, which is applied to the clock inputs via resistors, experiences a delay dependent on the capacity of respective the electrode. The Q outputs of the flip flops are then processed to determine the level. The known level sensor only detects a change in capacity and thus the level to be determined. The level sensor, however, is not capable of measuring the capacities of the individual capacitors.

The disadvantage of the known level sensor is, that it comprises a plurality of signal or control lines extending through the length of the probe, thus complicating the design and the manufacture of the sensor, especially when the number of electrodes is large or when different sensor types with different numbers of electrodes are to be manufactured.

SUMMARY OF INVENTION

Therefore, an object of the invention is to simplify the design and manufacture of the known level sensor.

According to the invention this is achieved by the level sensor defined in at least on independent claim.

Preferred embodiments of the level sensor according to the invention are specified in the remaining claims.

The electrodes can either be successively and separately connected to a single measuring circuit via controllable switches or they are connected to individually associated measuring circuits which can be successively and separately activated. As the control means for controlling the switches or activating the measuring circuits is subdivided into control units which are respectively arranged in the segments of the probe, only a single control line is needed for controlling the switches or activating the measuring circuits to successively and separately measure the capacities of the individual capacitors. In contrast to this, the known level sensors comprise a plurality of parallel control lines corresponding to the number of electrodes.

The single control line and a line for connecting the electrodes to the single measuring circuit or for transmitting the measuring signals generated by the measuring circuits may be one integral line or can be separate lines. In the latter case, the single control line can be divided into line segments between the control units in the different segments of the probe, the line segments consecutively connecting control outputs of the control units to control inputs of the respective following control units. Then, a control signal can be passed through the chain of control units like a relay baton.

The respective control units can be individually selected by an address signal onto the single control line. They can alternatively each comprise a timer means to be started by a start signal onto the single control line and control the associated switch or activate the associated measuring circuit after the elapse of a predetermined time from the start. Finally, they can generate a control signal and send it to the respective following control unit when the local measurement is completed.

The or each measuring circuit may comprise a signal generator for applying an electrical signal to the respective capacitor and a receiver for measuring the voltage across or the current through the capacitor. Alternatively, the or each measuring circuit comprises an oscillator wherein the respective capacitor forms a frequency-determining element of said oscillator. The or each measuring circuit then preferably further comprises a counting means for counting the oscillations of said oscillator until a predetermined number is reached wherein the measuring signal of the measuring circuit is generated in response to the time needed for counting.

The common ground electrode as a necessary complement to the electrodes in the probe segments for forming the capacitors can be the wall of the vessel, a separate electrode outside or inside the vessel, or can be formed by those of the electrodes which, at the moment, are not used for the measurement. For this purpose, the control units each preferably comprise a controllable switching means for connecting the associated electrode to a common ground line outside the periods when the associated switch is controlled or the associated measuring circuit is activated, the electrodes connected to the common ground line thus forming the common ground electrode.

BRIEF DESCRIPTION OF THE DRAWINGS

The invention will be now described by way of preferred examples and with reference to the accompanying drawing, in which:

FIG. 1 shows an embodiment of the filling level sensor according to the invention in the installed state;

FIGS. 2 to 4 show different embodiments of the level sensor having a plurality of electrodes individually connectable to a measuring circuit;

DETAILED DESCRIPTION OF INVENTION

Figure 5:
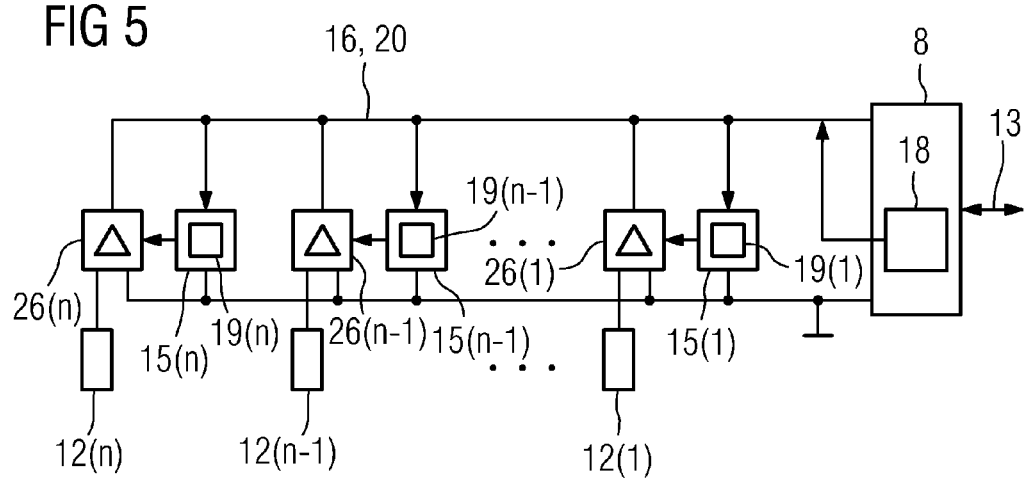
FIGS. 5 to 7 show different embodiments of the level sensor having a plurality of electrodes and measuring circuits which can be individually activated.

FIG. 1 shows a vessel 1 filled with a measuring medium 2, for example a fluid, consisting of different components. The components as well as gases above the fluid level 3 form different layers 4 with different dielectric constants in the vessel 1. A capacitive level sensor 5 is inserted into the vessel 1. The level sensor 5 comprises a rod-shaped probe 6 dipping into the measuring medium 2, a head housing 7 positioned outside the vessel 1 and containing a transmitter controller 8, and a flange 9 for mounting the level sensor 5 on an upper lid 10 of the vessel 1.

The probe 6 is longitudinally segmented into a plurality of segments 11, each segment 11 comprising a preferably annular electrode 12 and each electrode 12 forming an electrical capacitor to a common ground electrode, which can be the wall of the vessel 1, a separate electrode outside or inside the vessel 1, or can, as described further below, be formed by those of the electrodes 12 which, at the moment, are not used for the measurement. The electrodes 12 can be inserted into a pipe to protect them from mechanical damage and from the surrounding fluid.

As described in more detail below, the capacities between the electrodes 12 and the common ground electrode are successively and separately measured, thus obtaining a plurality of measuring signals in dependence on the capacities of the individual capacitors. These measuring signals are further processed by the transmitter controller 8 to be displayed on site and/or to be transmitted over a field bus or two-wire cable 13 to a process automation system. The transmitter controller 8 further receives commands and parameters from the process automation system.

FIG. 2 shows a block diagram of an embodiment of the level sensor comprising the probe 6 and the head housing 7. The probe 6 is segmented into a plurality of n segments 11 (1) ... 11(n–1), 11 (n) containing controllable switches 14 (1) ... 14(n–1), 14(n), control units 15(1) ... 15(n–1), 15(n) and the electrodes 12(1) ... 12(n–1), 12(n). The electrodes 12 are connected via their associated switches 14 to a common line 16 which leads to the measuring input of a measuring circuit 17 inside the head housing 7. The output of the measuring circuit 17 is connected to the transmitter controller 8 which comprises a measurement enabling means 18 for enabling the level measurement in response to a command received over the bus or cable 13. In the present embodiment, the measurement enabling means 18 generates a series of n address signals which are successively transmitted via the line 16 to the control units 15. Each of the control units 15(1) ... 15(n–1), 15(n) comprises an address reading means 19(1) ... 19(n–1), 19(n) for allowing the respective control unit 15 to be individually selected by the appropriate address signal. The control units 15 then control the associated switches 14 to successively and separately connect the electrodes 12 to the measuring input of the measuring circuit 17. The measuring circuit 17 generates a plurality of measuring signals in dependence on the capacities of the individual capacitors, which measuring signals are further processed by the transmitter controller 8 to be displayed on site and/or to be transmitted over the bus or cable 13. The line 16 fulfills both the function to connect the electrodes 12 to the measuring circuit 17 and the function of a single control line 20 between the measurement enabling means 18 and the control units 15.

FIG. 3 illustrates an embodiment which differs from that shown in FIG. 1 in that the line 16 and the control line 20 are separately provided for connecting the electrodes 12 to the measuring circuit 17 and for connecting the control units 15 to the measurement enabling means 18. Furthermore, instead of the address reading means 19, the control units 15(1) ... 15(n–1), 15(n) each comprise a timer means 21(1) ... 21(n–1), 21(n) to be synchronously started by a start signal from the measurement enabling means 18. The timer means 21 have predetermined time bases which increase stepwise from segment to segment. The control units 15 control the associated switches 14 after the elapse of the respective times to successively and separately connect the electrodes 12 to the measuring input of the measuring circuit 17.

The embodiment of FIG. 4 differs from the aforedescribed embodiment of FIG. 3 in that the single control line 20 is divided into line segments 22(1) ... 22(n–1), 22(n) between the control units 15(1) ... 15(n–1), 15(n). Each line segment, e.g. 22(n), thereby connects a control output, e.g. 23(n–1), of the respective control unit 15(n–1), which is closer to the measurement enabling means 18, to a control input 24(n) of the following control unit 15(n), which is farther away. The measurement enabling means 18 is connected to control input 24(1) of the control unit 15(1) closest to it. The start signal generated by the measurement enabling means 18 is passed through the chain of control units 15 like a relay baton. For that purpose, the control units 15(1) ... 15(n–1), 15(n) each comprise a means 25(1) ... 25(n–1), 25(n) for generating a control signal to be sent to the respective following control unit 15 when the local measurement is completed.

It is clear that many other variations can be achieved by combining different features of the embodiments of FIGS. 2, 3 and 4. For example, the start signal of the measurement enabling means 18 in FIG. 4 can be sent to the first control unit 15(1) via line 16 as shown in FIG. 1. The control signal of means 25 indicating that the local measurement is completed can be sent to the measurement enabling means 18 via line 16 as shown in FIG. 1; the enabling means 18 then can select or address the respective next control unit 15 for measurement. The address reading means 19 shown in FIG. 2 can be exchanged with the timer means 21 of FIG. 3.

Figure 6:
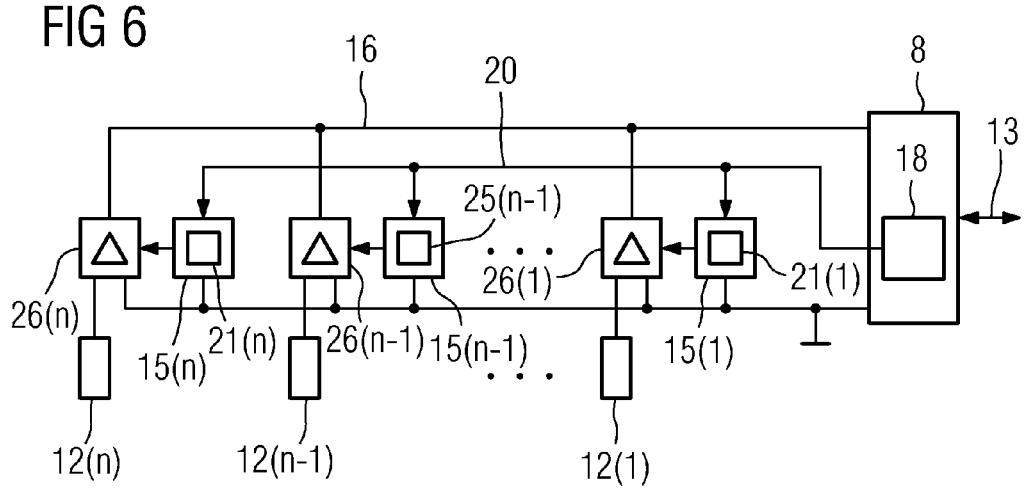
Figure 7:
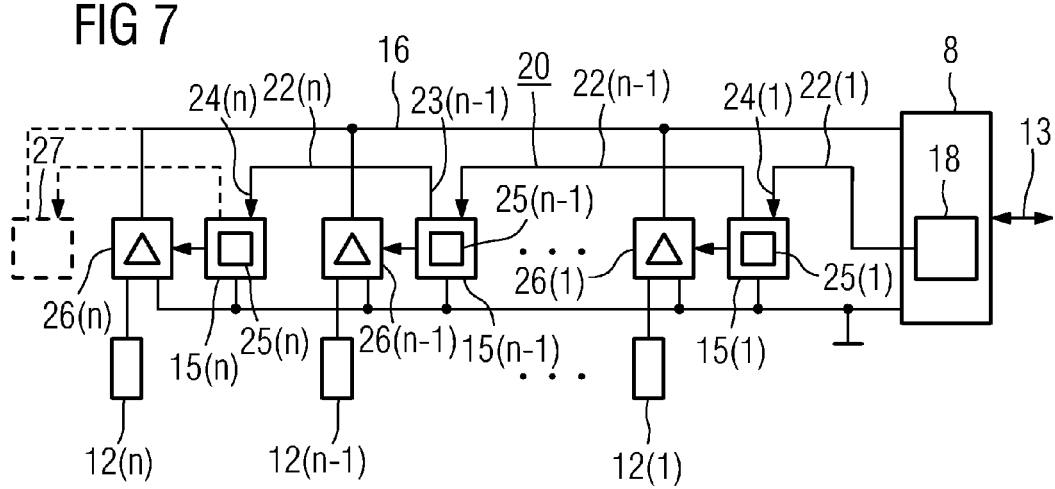

FIGS. 5, 6 and 7 show embodiments of the level sensor according to the invention which differ from those in FIGS. 2, 3 and 4 in that the controllable switches 14(1) . . . 14(n−1), 14(n) are replaced by a plurality of controllable measuring circuits 26(1) . . . 26(n−1), 26(n), which in turn replace the single measuring circuit 17 of FIGS. 2, 3 and 4. The advantage of this is that the measuring signals are generated at locations close to the electrodes 12, thus avoiding the influence of stray capacities of the line 16. FIG. 7 shows the possibility to add an end unit 27 at the end of the chain of control units 15, the end unit 27 signalling the completion of the whole measurement cycle to the measurement enabling means 18 via line 16. For the rest, the embodiments of FIGS. 5, 6 and 7 are the same as those in FIGS. 2, 3 and 4, so like parts are designated by like reference numerals and symbols and are not described in any further detail.

As known from the above-mentioned U.S. Pat. Nos. 6,101, 873 or 6,761,067 the measuring circuit 17 or each of the measuring circuits 26 may comprise a signal generator, for example a voltage source, for applying an electrical signal to the respective capacitor and a receiver for measuring the voltage across or the current through the capacitor. Alternatively and preferably, the measuring circuit 17 or each of the measuring circuits 26 comprises an oscillator wherein the respective capacitor forms a frequency-determining element of said oscillator.

Figure 8:
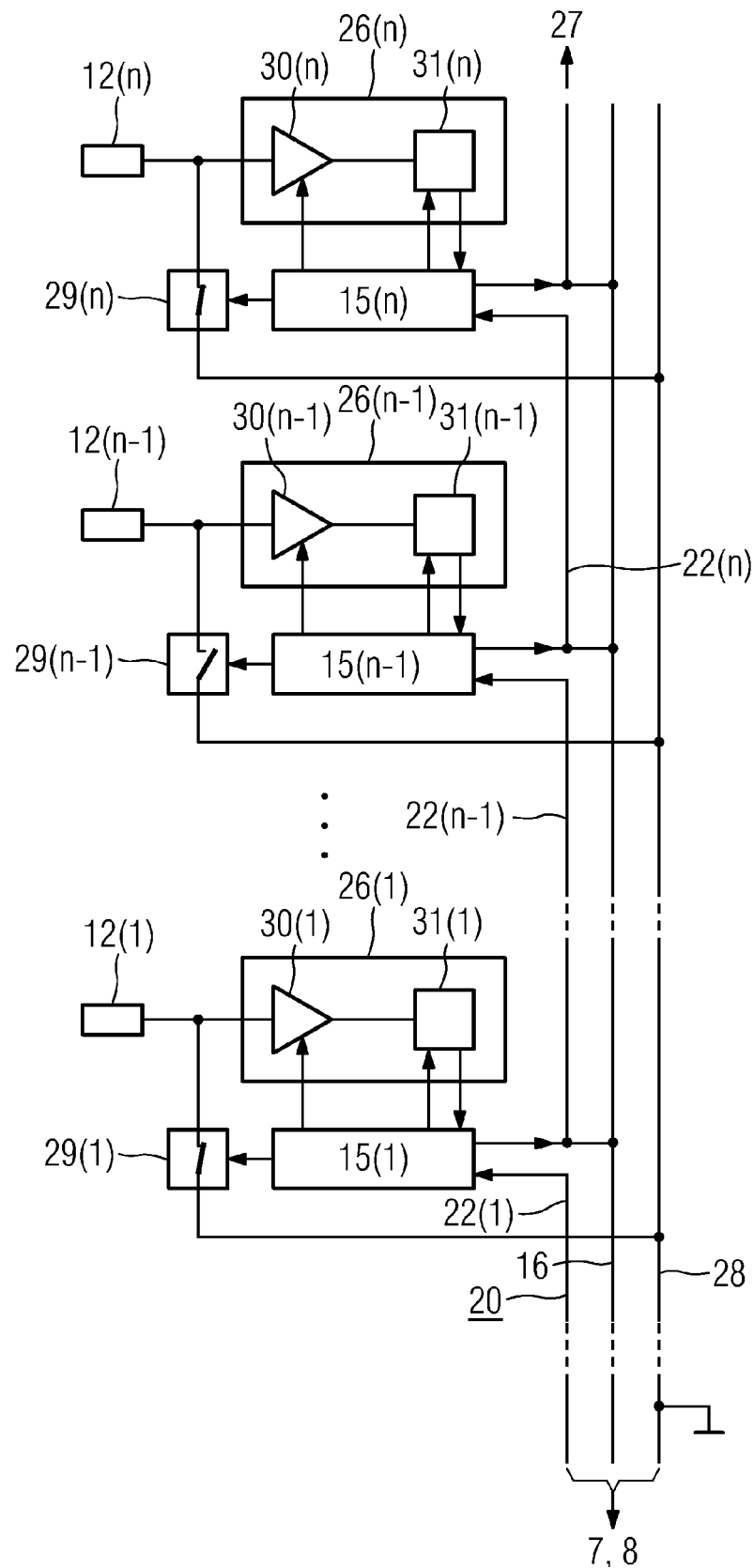
FIG. 8 shows an embodiment of the filling level sensor having a plurality of electrodes individually connectable to a ground line to form a ground electrode.

The block diagram of FIG. 8 shows part of the embodiment of FIG. 7 in more detail comprising the electrodes 12(1) . . . 12(n−1), 12(n), and their allocated controllable measuring circuits 26(1) . . . 26(n−1), 26(n) and control units 15(1) . . . 15(n−1), 15(n). The measuring circuits 26 are connected to the measuring line 16 and the control units 15 to the control line 20, which is divided into the line segments 22(1) . . . 22(n−1), 22(n). The electrodes 12(1) . . . 12(n−1), 12(n) are connectable to a common ground line 28 via switching means 29(1) . . . 29(n−1), 29(n), which are controlled by the respective control units 15. Each of the measuring circuits 26 comprises an amplifier 30(1) . . . 30(n−1), 30(n) which together with the capacity of the respective electrode 12 forms an oscillator. The measuring circuits 26 further comprise each a counting means 31(1) . . . 31(n−1), 31(n) for counting the oscillations of the respective oscillator 30 until a predetermined number is reached. Thus, the time needed for counting corresponds to the capacity to be measured.

In a deactivated or rest state, the oscillators or amplifiers 30 are switched off, the counting means 31 are reset to zero and the switching means 29 are closed to connect the electrodes 12 to the ground line 28. When one of the control units, e.g. 15(n−1) receives a control or start signal via the control line segment 22(n−1) from the preceding control unit 15(n−2), it controls the allocated switching means 29(n−1) to disconnect the electrode 12(n−1) from the ground line 28, switches the oscillator or amplifier 30(n−1) on and starts the counting means 31(n−1). The remaining electrodes 12(1) . . . 12(n−2), 12 (n), which are still connected to the common ground line 28, form the ground electrode which together with the single disconnected electrode 12(n−1) forms a capacitor. The counting means 31(n−1) counts the oscillations of the respective oscillator and causes the control unit 15(n−1) to output a signal, for example a single pulse, onto the measuring line 16 and the control line segment 22(n) when the predetermined number of oscillation cycles is reached. This signal is both a control or start signal and a measuring signal, wherein the control or start signal activates the following control unit 15(n) and the wherein intervals between the successive measuring signals from the different probe segments are directly proportional to the capacities.

The invention claimed is:

1. A capacitive level sensor, comprising:
a probe to be dipped into a measuring medium and longitudinally segmented into a plurality of segments, each segment comprising an electrode and each electrode forming an individual electrical capacitor to a common ground electrode;
a measuring circuit for generating a plurality of measuring signals depending on capacities of the individual electrical capacitors;
a plurality of controllable switches individually arranged in the segments of the probe, wherein each switch is connected to the electrode of each segment and to a measuring input of the measuring circuit; and
a control device for controlling said switches to successively and separately connect the individual electrical capacitors to the measuring input of the measuring circuit,
wherein the control device is subdivided into control units respectively arranged in the segments of the probe and connected among each other by a single control line.

2. A capacitive level sensor, comprising:
a probe to be dipped into a measuring medium and longitudinally segmented into a plurality of segments, each segment comprising an electrode and each electrode forming an electrical capacitor to a common ground electrode;
a plurality of controllable measuring circuits individually arranged in the segments of the probe, wherein each measuring circuit is connected to the electrode of the respective segment; and
a control device for successively and separately activating the measuring circuits to generate measuring signals depending on capacities of the electrical capacitors,
wherein the control device is subdivided into control units respectively arranged in the segments of the probe and connected among each other by a single control line.

3. The capacitive level sensor of claim 1, wherein the measuring circuit comprises a signal generator for applying an electrical signal to the respective capacitor, and further comprises a receiver for measuring the voltage across or the current through the capacitor, wherein the measuring signal of the measuring circuit is generated in response to the measured voltage or current.

4. The capacitive level sensor of claim 2, wherein each measuring circuit comprises a signal generator for applying an electrical signal to the respective capacitor, and further comprises a receiver for measuring the voltage across or the current through the capacitor, wherein the measuring signal of the measuring circuit is generated in response to the measured voltage or current.

5. The capacitive level sensor of claim 1, wherein the measuring circuit comprises an oscillator, wherein the respective capacitor forms a frequency-determining element of said oscillator, and wherein the measuring signal of the measuring circuit is generated in response to the frequency of said oscillator.

6. The capacitive level sensor of claim 2, wherein each measuring circuit comprises an oscillator, wherein the respective capacitor forms a frequency-determining element of said oscillator, and wherein the measuring signal of the measuring circuit is generated in response to the frequency of said oscillator.

7. The capacitive level sensor of claim 5, wherein the measuring circuit further comprises a counter for counting the oscillations of said oscillator within a predetermined measuring time period, wherein the measuring signal of the measuring circuit is generated in response to the counted number of oscillations.

8. The capacitive level sensor of claim 6, wherein each measuring circuit further comprises a counter for counting the oscillations of said oscillator within a predetermined measuring time period, wherein the measuring signal of the measuring circuit is generated in response to the counted number of oscillations.

9. The capacitive level sensor of claim 5, wherein the measuring circuit further comprises a counter for counting the oscillations of said oscillator until a predetermined number is reached, wherein the measuring signal of the measuring circuit is generated in response to the time needed for counting.

10. The capacitive level sensor of claim 1, wherein the common ground electrode is formed of the wall of a conductive vessel containing the measuring medium.

11. The capacitive level sensor of claim 1, wherein the common ground electrode is formed by a separate elongated electrode on or along the probe.

12. The capacitive level sensor of claim 1, wherein the control units each comprise a controllable switch for connecting the associated electrode to a common ground line outside the periods when the associated switch is controlled or the associated measuring circuit is activated, the electrodes connected to the common ground line thus forming the common ground electrode.

13. The capacitive level sensor of claim 1, wherein the control units each comprise an address reader for allowing the respective control unit to be individually selected by an address signal onto the single control line for controlling the associated switch or activating the associated measuring circuit.

14. The capacitive level sensor of claim 1, wherein the control units each comprise a timer to be started by a start signal onto the single control line and controlling the associated switch or activating the associated measuring circuit after the elapse of a predetermined time from the start.

15. The capacitive level sensor of claim 1, wherein the control units each comprise a generator to generate a control signal to be applied on the control line when the generation of the measuring signal is completed.

16. The capacitive level sensor of claim 1, wherein the single control line is formed separately from a line for connecting the electrodes to the measuring input of the measuring circuit or for transmitting the measuring signals generated by the measuring circuit.

17. The capacitive level sensor of claim 16, wherein the single control line is divided into line segments between the control units in the different segments of the probe, the line segments consecutively connecting control outputs of the control units to control inputs of the respective following control units.

18. The capacitive level sensor of claim 1, wherein the single control line and a line for connecting the electrodes to the measuring input of the measuring circuit or for transmitting the measuring signals generated by the measuring circuit are combined to form a single line.

19. The capacitive level sensor of claim 2, wherein the single control line and a line for connecting the electrodes to the measuring input of the measuring circuit or for transmitting the measuring signals generated by the measuring circuits are combined to form a single line.

20. The capacitive level sensor of claim 4, wherein the single control line and a line for connecting the electrodes to the measuring input of the measuring circuit or for transmitting the measuring signals generated by the measuring circuits are combined to form a single line.

* * * * *